March 31, 1936. F. R. DIETRICH 2,035,692
DIVIDED PISTON
Filed April 5, 1933
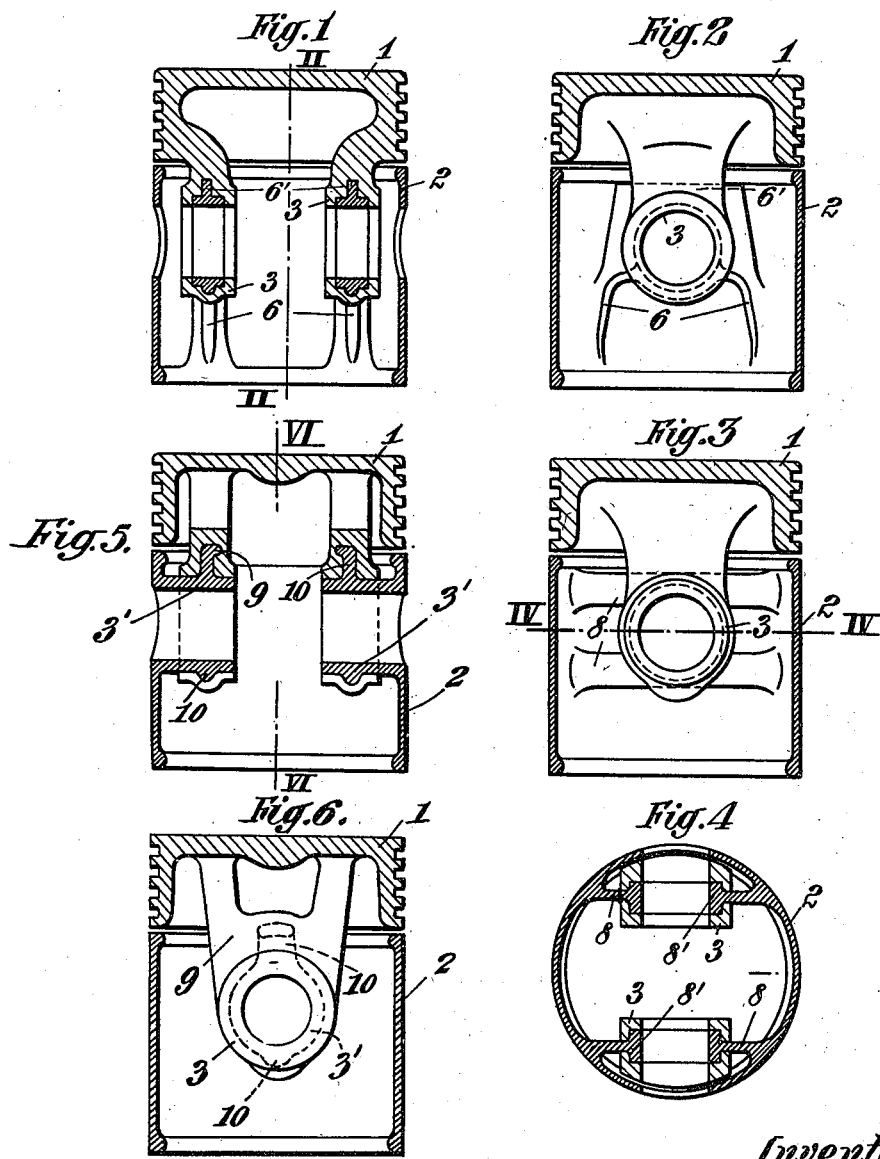
Inventor:
Friedrich Richard Dietrich
By [signature]
Attorney Patented Mar. 31, 1936

2,035,692

UNITED STATES PATENT OFFICE 2,035,692

DIVIDED PISTON

Friedrich Richard Dietrich, Pasing near Munich, Germany

Application April 5, 1933, Serial No. 664,659
In Germany April 8, 1932

5 Claims. (Cl. 309—14)

The present invention relates to divided pistons and particularly to divided pistons comprising a head member of a metal of high conductivity, for instance light metal and a skirt member of a metal which is not as conductive to heat as the material of the head member but is more resistant to wear, for instance, gray cast iron.

Divided pistons are old and it is an object of my invention to provide an improved divided piston.

To this end, in combination with a head member of light metal, I arrange a skirt member which is circumferentially continuous at all places material for the preservation of alignment between the piston members, that is, it is a sleeve without any slots or recesses forming radially resilient portions, and is made of a metal which is more resistant to wear than the metal of the head member and spaced from the head member in the axial direction of the piston. I also arrange a pair of gudgeon pin bearings and means which connect the head member and the piston member to each other through the bearings and are so designed as to yield only under thermal stress and in the radial direction of the piston.

By these means I provide a connection between the two piston members which is so yielding as to prevent deformation of the skirt member by the heat expansion of the head member while at the same time it is practically rigid against the mechanical forces transmitted to the piston by the connecting rod so that the piston members never become disaligned.

The heat transfer from the head member to the skirt member is reduced to a minimum by the axially spaced position of the members, and springing of the skirt which leads to disalignment of the piston members is prevented by designing the skirt as a substantially circumferentially continuous sleeve.

It has already been proposed in divided pistons to provide a circumferentially continuous cast-iron skirt member on a head member of light metal, and means for connecting the two members, but in this piston the skirt member is not spaced from but placed on the head member and the connecting means are resilient in radial direction.

It has also been proposed to space the skirt member from the head member in a piston in which both members are integral and cast of the same light metal alloy. In such a piston the wear in the two members is obviously the same. Another distinction is that the skirt member is slotted instead of being circumferentially continuous.

As against this state of the art my novel piston presents the following features:

1. A skirt member which is circumferentially continuous to preserve alignment with the head member;
2. Higher resistance to wear in the skirt than in the head member;
3. Reduction of heat convection from the head to the skirt member by spacing the members in axial direction;
4. A connection between the two members which yields only to thermal stresses but is substantially rigid to connecting rod forces.

My invention may be reduced to practice in various ways as will be described.

In one embodiment of my invention, I provide connecting parts shaped like stirrups or like the inverted letter U, which are integral with the skirt member and with the corresponding bearings, and are connected to the head member by castings which are integral with the head member at one end and cast about the corresponding bearing at the free end.

In another embodiment, I provide a rib, or preferably a pair of ribs, for each bearing, which rib, or ribs, is arranged as a chord in the skirt member with which it is integral at both ends, while its central portion is integral with the corresponding bearing. The connection to the head member is effected by castings as described.

In the two embodiments referred to, the "yield" to thermal stresses is in the connecting parts. In a third embodiment it is in the castings and the bearings are integral with the skirt member at their outer ends.

Some constructional forms of the invention are illustrated by way of examples in the accompanying drawing.

Fig. 1 is an axial section view showing a piston according to the invention in which the head member is connected to the skirt member by means of radially yielding U-shaped connecting members or straps.

Fig. 2 is a section on the line II—II in Fig. 1.

Fig. 3 is an axial section of a piston having pairs of radially yielding ribs.

Fig. 4 is a section on the line IV—IV in Fig. 3.

Fig. 5 is an axial section of a piston in which the castings are yielding radially.

Fig. 6 is a section on the line VI—VI in Fig. 5.

In all figures 1 denotes a head member of a material having a high conductivity, for instance light metal, and 2 denotes a cylindrical skirt member of a metal having a high resistance to wear, such as for instance gray cast iron.

According to Figs. 1-3 the head member 1 and the shank member 2 of the piston are interconnected by yielding straps or stirrups 6 which, as will appear from Fig. 2, have the shape of the inverted letter U, and the intermediate sections of the straps 6 are widened into central bridge sections and form bearings 6' for the gudgeon pin, not shown, which are surrounded by the castings 3 projecting freely into the skirt member from the head member with which their upper ends are integral. The lower ends of the castings 3 are cast about the bearings 6' and surround them. The radial yield of the connection resides in the straps 6. In this constructional form the connection points between the skirt member and the head member are relieved from the piston forces.

The head member may also be connected to the skirt member by means of transverse ribs or bridge elements, which penetrate the castings 3 and in a way form chords in the shank member.

As shown in Figs. 3 and 4 each casting may be combined with two radially yielding transverse ribs 8, which are arranged as a cord within the skirt member, and like the straps 6 in Figs. 1 and 2 form bearing 8' for the gudgeon pin with their central bridge sections, which are seated within the corresponding casting 3 of the head member 1.

The ribs 8 will under the influence of the thermal expansion of the head member yield in radial direction and thus exert the same effect as the rods and the support straps described in the foregoing.

According to Figs. 5 and 6 the head member is connected to the skirt member by means of castings 9, which are cast integral with the head member. Said castings project into the interior of the skirt member 2 and are resilient in radial direction. The bearings 3' are in this case cast integral with the skirt member 2 at their outer ends and are connected to the castings 9 by casting. Tilting movements are prevented by one or more projections 10 which are embedded in the castings 9. The supporting effect is increased by the form of the castings 9, which from the top of the head member converge towards the bearings for the piston rod pin.

It is obvious that various changes and modifications may be made in practicing the invention, in departure from the particular showing and description, without departing from the true spirit of the invention.

I claim:—

1. A divided piston comprising a head member, a skirt member, substantially U-shaped connecting straps arranged transversely to the axis of the gudgeon pin, castings for the gudgeon pin depending from the head member, central bridge sections of said connecting straps being widened to bearings for the gudgeon pin and the depending castings of the head member having ends surrounding said gudgeon pin bearings and cooperating with the same, said connecting straps being yielding in a direction radially to the axis of the piston and preventing tiltings of the head member.

2. A divided piston comprising a head member of light metal, a substantially circumferentially continuous skirt member made of a metal whose resistance to wear exceeds that of the light metal, and spaced from said head member in the axial direction of the piston, a pair of gudgeon pin bearings, a rib which is arranged as a chord within said skirt member for each bearing and integral with the skirt member and the corresponding bearing, and is so designed as to yield only under thermal stresses and in the radial direction of the piston, and a casting which is integral with said head member at one end and cast about each bearing at its free end.

3. A divided piston comprising a head member of light metal, a substantially circumferentially continuous skirt member made of a metal whose resistance to wear exceeds that of the light metal, and spaced from said head member in the axial direction of the piston, a pair of gudgeon pin bearings which are integral with said skirt at their outer ends, and a casting which is integral with said head member at one end projects freely into said skirt member with its free end, and is cast about each bearing at such free end, and is so designed as to yield only under thermal stresses and in the radial direction of the piston.

4. A divided piston comprising a head member of light metal having piers depending therefrom, said piers having piston pin bearings formed therein; a substantially circumferentially continuous skirt member made of a metal whose resistance to wear exceeds that of the light metal and which is spaced from said head member in the axial direction of the piston, said skirt being substantially cylindrical for its full length; and means homogeneous with the skirt member and terminating in and forming part of the pin bearings as interconnections with the piers.

5. A divided piston according to claim 4, in which the piers are integral with the head member and in which the means is integral with the skirt member.

FRIEDRICH RICHARD DIETRICH.